July 20, 1965
L. L. GENUIT
3,196,340
CURRENT LIMITING INVERTERS FOR OPERATING ELECTRIC
DISCHARGE DEVICES AND OTHER LOADS
Filed May 1, 1963
3 Sheets-Sheet 1
*Fig. 1.*
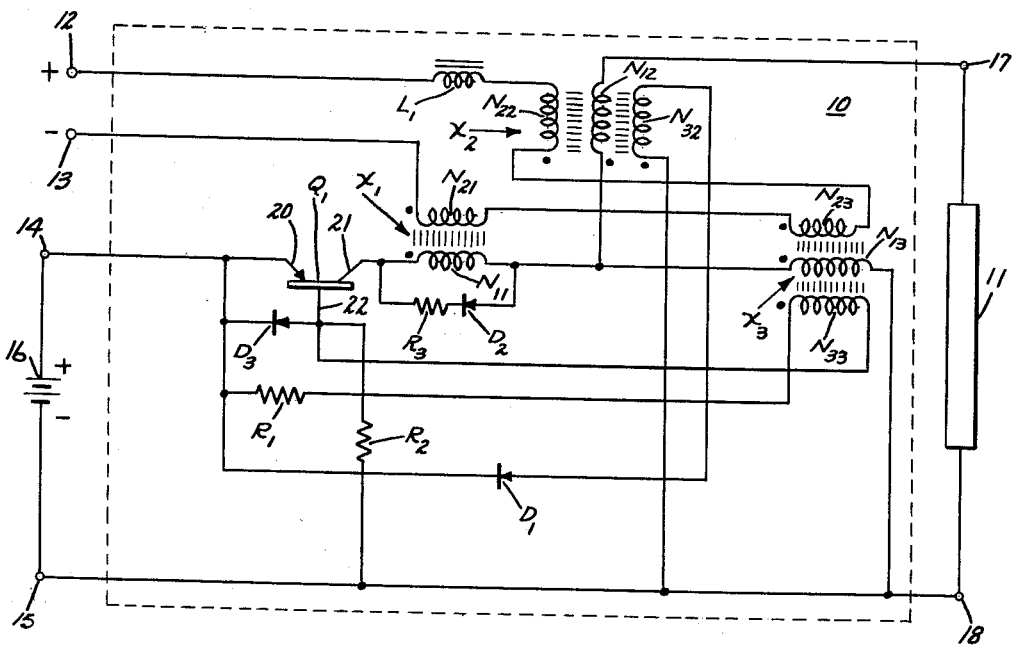
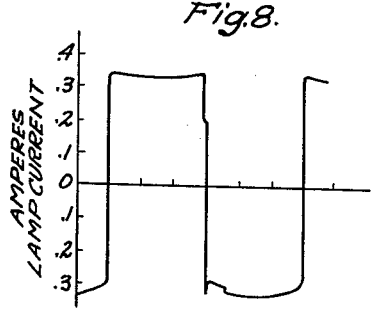
*Fig. 8.*
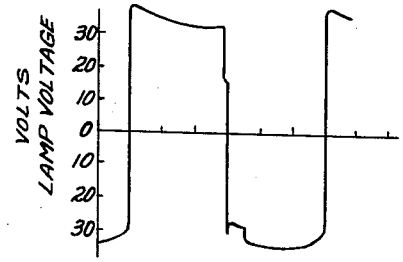
*Fig. 9.*
Inventor:
Luther L. Genuit,
by Henry J. Marciniak
Attorney.

Inventor:
Luther L. Genuit,
by Henry J. Marcinek
Attorney.

United States Patent Office 3,196,340
Patented July 20, 1965

3,196,340
CURRENT LIMITING INVERTERS FOR OPERATING ELECTRIC DISCHARGE DEVICES AND OTHER LOADS
Luther L. Genuit, Danville, Ill., assignor to General Electric Company, a corporation of New York
Filed May 1, 1963, Ser. No. 277,348
15 Claims. (Cl. 331—111)

This invention relates to electrical apparatus and more particularly to current limiting inverters for operating electric discharge devices and other loads which require a limited or regulated current supply.

Although in recent years the use of solid state inverter circuits has been frequently proposed for the high frequency operation of loads, such as fluorescent lamps, that essentially have a negative resistance characteristic, there has been no widespread commercial acceptance of such circuits. A disadvantage of conventional solid state inverter circuits is that they are not inherently current limiting. When such inverter circuits are used to supply a high frequency potential for operating fluorescent lamps, there must be included at the output of the inverter a means for effectively ballasting the lamp current. For example, a ballasting reactor is generally used to perform the current limiting or ballasting function.

Accordingly, a general object of the invention is to provide an improved inverter for operating loads, such as electric discharge devices, that require a substantially regulated current.

It is a more specific object of the present invention to provide an improved solid state inverter for supplying a regulated current to a load wherein the inverter is inherently current-limiting.

Another object of the present invention is to provide an improved inverter for supplying an alternating potential from a D.C. source wherein reactors having relatively small volt-second ratings are employed to control the load current level and the switching action of the semiconductor switching device.

It is still a further object of the present invention to provide an improved apparatus for operating electric discharge devices, such as fluorescent lamps, wherein the apparatus is characterized by a relatively high circuit efficiency as compared with circuits employing ballasting reactors.

According to one form of my invention I have provided an improved inverter, that is inherently current-limiting, for supplying an alternating potential for operating loads, such as fluorescent lamps. The inverter preferably includes a single semiconductor switching device, for example a transistor, a four layer diode, a silicon controlled rectifier, or a gate-turn-off controlled rectifier, and a pair of saturating reactors. Each of the saturating reactors has a saturable core, a main winding wound on the saturable core and a bias means associated therewith for applying a bias magnetomotive force in opposing relationship to the magnetizing magnetomotive force of the main winding. The bias means may include, for example, a bias winding inductively coupled with the main winding on the saturable core, a D.C. choke and a D.C. bias source.

The load is connected with one of the saturating reactors in a first parallel circuit branch, and the other saturating reactor is connected in a second parallel branch, both of the parallel branches being connected in circuit with the switching device and a D.C. source. A feedback winding is coupled on one of the saturating reactors to provide a path for the return of energy to the D.C. source during the recovery of the reactor when the supply of potential from the source is interrupted by the switching device. During the interval that the supply of potential from the source is interrupted by the switching device, the other reactor controls the supply of energy to the load from the bias means to provide the negative half cycle of the alternating potential supplied to the load, the positive half cycle being supplied from the D.C. source when the switching device is in the low impedance condition. During the positive half cycle the current through the first and second circuit branches is maintained at controlled levels by the high inductive impedance presented by the saturating reactors during their unsaturated condition.

In another more specific aspect of my invention, I have included an additional saturating reactor in series with the switching device thereby utilizing three saturating reactors. The first saturating reactor is connected in series circuit relation with the semiconductor switching device. The second saturating reactor is connected in circuit with the output terminals of the inverter in a first circuit branch. The first circuit branch is connected in parallel with a second circuit branch which includes the third saturating reactor.

In order to limit the current supplied from the source to the two circuit branches during the positive half cycle when the semiconductor switching device is in a low impedance condition, the main windings of the second and third saturating reactors are provided with predetermined numbers of turns sufficient to provide in each reactor at the desired current level the magnetizing magnetomotive force that cancels the bias magnetomotive force. Thus, the currents through the first and second circuit branches are maintained at controlled levels by the high inductive impedance presented by the second and third saturating reactors during their unsaturated condition. However, the first saturating reactor during a greater portion of the positive half cycle is essentially saturated since the sum of the branch currents is insufficient to develop a magnetizing magnetomotive force equal to the bias magnetomotive force.

Near the end of each positive half cycle when the third saturating reactor approaches saturation to cause an increase in current through the main winding of the first saturating reactor, the first saturating reactor is driven out of saturation and supports voltage. This results in a reduction of the voltage across the third saturating reactor, and this voltage change is utilized to drive the semiconductor switching device to its high impedance condition. An auxiliary winding is provided on the saturable core of the third saturating reactor to drive the semiconductor switching device to a high impedance state in response to the collapse of voltage across the main winding.

During the negative half cycle of the alternating potential at the output terminals of the inverter, the semiconductor switching device is in a high impedance state, and thus the saturating reactors are allowed to recover. During recovery the reactor voltage is of reverse polarity relative to the polarity during the positive half cycle. The current to the output terminals during the negative half cycle is supplied by energy that had been stored in the bias means during the low impedance condition of the semiconductor switching device. The third saturating reactor controls the supply of this energy to the load, holding load current at the desired level for the desired period of time. At the end of the recovery period the voltage across the third saturating reactor collapses, and the semiconductor switching device is driven toward a low impedance condition to start another cycle by a base drive current supplied through a resistor from the D.C. source.

In another aspect of the invention I have provided a feedback winding on the saturable core of the second saturating reactor. This feedback winding is inductively coupled with the main winding and is connected across the input terminals to provide a return path to the D.C. source for energy released by the D.C. choke during the recovery period of the second saturating reactor. During the recovery period of the second saturating reactor, control of the energy returned to the D.C. source is provided by both the second and third saturating reactors. I have provided a resistor and a diode connected in shunt with the main winding of the first saturating reactor to provide a means for dissipation of energy during the recovery period of the first saturating reactors.

With the improved saturating reactor arrangement, it is possible to provide an output current having an essentially square waveform. The saturating reactors can be designed to control the load current supplied by energy returned from the bias means so that it effectively matches the waveform of the current supplied directly from the D.C. source. An optimum lamp current waveform can be provided for operating loads, such as electric discharge lamps, at a lower R.M.S. lamp current as compared with a sinusoidal lamp current. The improved arrangement results in an efficient utilization of the volt-second capacity of a saturable reactor and enables reductions to be achieved in the size, weight and cost of the saturable reactors as compared with conventional ballasting reactors. Further, the improved arrangement does not require the use of tuned circuits or filter networks or reactive ballast elements to accomplish the inverting and current limiting function.

The subject matter which I regard as my invention is set forth in the appended claims. The invention itself, however, together with further objects and advantages thereof may be better understood by referring to the following description taken in connection with the accompanying drawings in which:

FIGURE 1 is a schematic diagram of an improved inverter embodying one form of my invention for operating a load such as a fluorescent lamp with a high frequency alternating potential;

FIGURE 8 shows the waveform for one complete cycle of the lamp current when a fluorescent lamp was operated by the inverter shown in FIGURE 1;

FIGURE 9 shows the waveform for one complete cycle of the lamp voltage where a fluorescent lamp was operated by the inverter shown in FIGURE 1.

Figure 2:
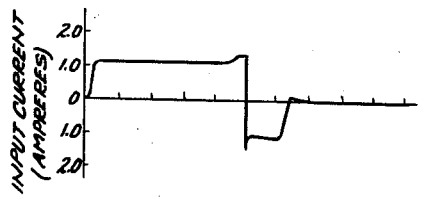
FIGURE 2 is a waveform of the input current corresponding to one complete cycle of the alternating current supplied at the output of the inverter shown in FIGURE 1.

Having more particular reference to the FIGURE 1 of the drawings, I have illustrated therein an inverter identified generally by reference numeral 10. The inverter 10 is adapted for supplying a regulated current to a load 11, which may be a negative impedance type of load, such as a fluorescent lamp. The components of the inverter 10 are shown enclosed in a dashed rectangle and include a PNP transistor $Q_1$ operating as a controlled switch, saturating reactors $X_1$, $X_2$ and $X_3$, a linear choke $L_1$, resistors $R_1$, $R_2$ and $R_3$, and diodes $D_1$, $D_2$ and $D_3$. To energize the apparatus 10, terminals or leads 12, 13 are connected to D.C. bias source (not shown), and terminals or leads 14, 15 are connected to a unidirectional source 16 having low A.C. impedance, such as the battery shown in the illustrated exemplification of the invention. The potential of the unidirectional source 16 is converted to an alternating potential which is supplied to the load 11 connected across the output terminals or leads 17, 18.

The transistor $Q_1$ used in the embodiment of the invention shown in FIGURE 1 was a junction type transistor having an emitter, collector and base electrode 20, 21, 22, respectively. In the closed or low impedance condition the transistor $Q_1$ exhibits a low impedance between the emitter and collector electrodes 20, 21. In the open condition or the high impedance condition the transistor $Q_1$ exhibits a high impedance between the emitter and collector electrodes 20, 21. Transistor $Q_1$ is switched to the low impedance condition when the base electrode 22 is rendered more negative than the emitter 20, and it is switched to its high impedance condition when the base electrode 22 is more positive than both the emitter and collector electrodes 20, 21.

When the inverter 10 is initially energized, transistor $Q_1$ is biased toward a low impedance condition by the bias current supplied through the resistor $R_2$ to the base electrode 22. The voltage induced in winding $N_{33}$ of reactor $X_3$ supplies additional forward bias current to hold $Q_1$ in a low impedance state prior to saturation of reactor $X_3$. The transistor $Q_1$, as will hereinafter be more fully described, is biased into a high impedance condition in response to the reverse recovery voltage of saturating reactor $X_3$.

The saturating reactors $X_1$, $X_2$, $X_3$ used in the exemplification of the invention had saturable cores which were toroidal in shape and preferably were made of a core material characterized by a substantially rectangular hysteresis loop. It will be appreciated that such core material has a magnetic characteristic such that a sharp saturation occurs at a preselected value of the core flux. The linear choke $L_1$ was used to limit harmonic currents in the bias windings $N_{21}$, $N_{22}$ and $N_{23}$ and to provide for energy storage in the bias means.

As will be seen in the circuit diagram of FIGURE 1, the current from the source 16 passes through the transistor $Q_1$, the main winding $N_{11}$ of saturating reactor $X_1$ and then flows through the parallel circuit branches, one of which includes the main winding $N_{12}$ of saturating reactor $X_2$ and the terminals 17, 18 to which load 11 is connected. The other parallel circuit branch includes the main winding $N_{13}$ of saturating reactor $X_3$. Feedback winding $N_{32}$ of the saturating reactor $X_2$ is coupled across the input terminals 14, 15 to allow a part of the energy released from the D.C. choke through the saturating reactors $X_2$ and $X_3$ to be returned to the source 16 when the transistor $Q_1$ is turned off. Diode $D_1$ insures that current will flow to the source 16 from the reactor $X_2$ only when the polarity of the voltage across the winding $N_{32}$ is such that its upper end, as seen in FIGURE 1, is positive with respect to the end with the dot. Diode $D_2$ which is connected in shunt with the main winding $N_{11}$ of reactor $X_1$ allows energy to be dissipated in the resistor $R_2$ during the recovery of reactor $X_1$ when the transistor $Q_1$ is turned off. Diode $D_3$ connected across the emitter-base junction of transistor $Q_1$ insures that the emitter-base junction will not be damaged by an excessive reverse bias voltage.

In FIGURES 2 through 7, I have illustrated the waveforms for one complete cycle of the input current, load voltage, emitter-collector voltage, and the voltages across the main windings $N_{11}$, $N_{12}$ and $N_{13}$ as observed on a cathode ray oscilloscope where the inverter 10 was used to operate a resistive load at a frequency of 1000 cycles per second.

Referring now more particularly to FIGURE 2, there is shown a plot of the instantaneous values of the current supplied from the source 16 against time for one cycle or a time interval of 1 millisecond. It will be noted that for a portion of the cycle represented by the negative values, energy is being returned to the source 16.

Figure 5:
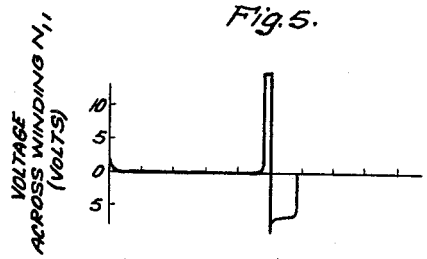
FIGURE 5 shows the waveform of the voltage across the winding $N_{11}$ of the saturating reactor $X_1$ used in the inverter shown in FIGURE 1.
Figure 3:
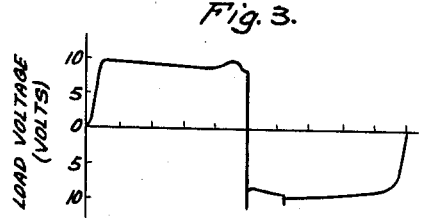
FIGURE 3 is a waveform of the voltage across a load energized by the output of the inverter of FIGURE 1.
Figure 6:
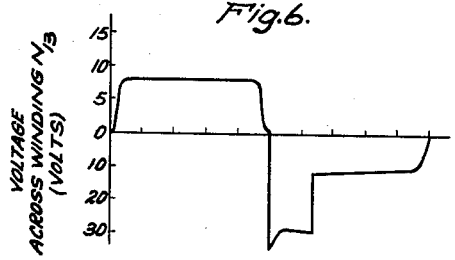
FIGURE 6 illustrates the waveform for one complete cycle of the voltage across the winding $N_{13}$ of the saturating reactor $X_3$ of the improved inverter shown in FIGURE 1.
Figure 4:
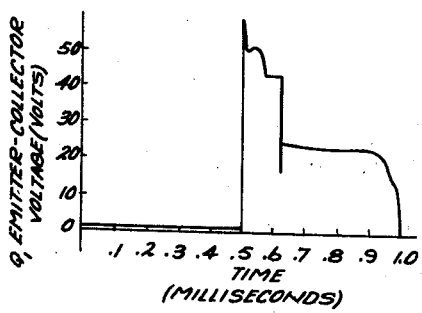
FIGURE 4 illustrates the waveform for one complete cycle of the emitter-collector voltage of the transistor used in the improved inverter illustrated in FIGURE 1.
Figure 7:
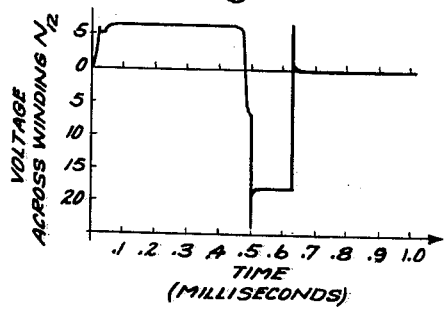
FIGURE 7 illustrates the waveform for one complete cycle of the voltage across the winding $N_{12}$ of the saturating reactor $X_2$ for one complete cycle of the apparatus shown in FIGURE 1.

In FIGURE 3 I have shown a waveform representing the load voltage against time. It will be seen that an alternating voltage having a substantially square waveform is supplied to the load. FIGURE 4 represents the plot of the instantaneous values of the emitter-collector voltage of the transistor $Q_1$ against time for 1 cycle. The waveforms shown in FIGURES 5, 6 and 7 represent a plot of the instantaneous values of the voltage across the main windings $N_{11}$, $N_{13}$ and $N_{12}$ respectively.

FIGURES 8 and 9 illustrate the lamp current and voltage waveforms for one complete cycle where the inverter 10 was designed to operate a fluorescent lamp at a frequency of approximately 1667 cycles per second. It was found that the waveforms were essentially the same whether a lamp or a resistive load was energized by the inverter 10.

The operation of the inverter 10 will now be more fully described. Let us assume that the transistor $Q_1$ is initially driven toward a low impedance condition by the emitter-base current which flows through the resistor $R_2$. As transistor $Q_1$ begins to turn on, a voltage develops across the winding $N_{13}$ of the reactor $X_3$, and a voltage is induced in winding $N_{33}$ which is coupled with the emitter-base junction of transistor $Q_1$. This voltage causes the transistor $Q_1$ to be driven into its low impedance condition very rapidly in a regenerative fashion. With transistor $Q_1$ in the low impedance condition, the source voltage is impressed across the winding $N_{11}$ and the parallel circuit branches which include the winding $N_{13}$ of reactor $X_3$ and the serially connected winding $N_{12}$ and load 11.

Reactors $X_2$ and $X_3$ have a sufficient number of turns in their main windings $N_{12}$, $N_{13}$ so that the current which now flows through them is sufficient to cancel the ampere-turns or magnetomotive force of the bias windings $N_{22}$ and $N_{23}$. However, the usm of the two branch currents flowing through the main windings $N_{12}$, $N_{13}$ which is equal to the current flowing through the main winding $N_{11}$ is insufficient to cancel the ampere-turns of the bias winding $N_{21}$ of reactor $X_1$. As will be seen from the waveform of the voltage across the winding $N_{11}$, shown in FIGURE 5, during this initial period there is substantially no voltage across the winding $N_{11}$, since the reactor $X_1$ will not support voltage while it is in a saturated condition.

Referring now to the waveform of the voltage across the winding $N_{13}$, as shown in FIGURE 6, at a point near the end of the conduction period of the transistor $Q_1$, the reactor $X_3$ begins to saturate. The current flowing through the reactor $X_3$ increases rapidly, and the current now flowing through the winding $N_{11}$ of the reactor $X_1$ is sufficient in magnitude to cancel the ampere-turns of the bias winding $N_{21}$. When this point is reached, the reactor $X_1$ comes out of saturation and now presents an impedance to the flow of current. The voltage across winding $N_{11}$ rises rapidly as reactor $X_1$ comes out of saturation. This increase in the voltage across winding $N_{11}$ of reactor $X_1$ is accompanied by a decrease in the voltage across winding $N_{13}$ of reactor $X_3$. As the voltage across the winding $N_{13}$ drops, the voltage across auxiliary winding $N_{33}$ and the base drive supplied to transistor $Q_1$ falls off thereby causing transistor $Q_1$ to begin to switch to a high impedance condition.

When transistor $Q_1$ reaches its high impedance condition, the voltage across winding $N_{13}$ undergoes a sharp reversal in order to maintain the flow of current. As a consequence of this voltage reversal, a reverse bias is applied at the emitter-base junction of the transistor $Q_1$ to hold it in a non-conducting condition. Also, at this point the voltage across the winding $N_{12}$ of reactor $X_2$ reverses rapidly, and current is established in the closed loop which includes winding $N_{13}$, the load 11 and winding $N_{12}$.

The voltages across windings $N_{12}$, $N_{13}$ rise instantaneously to the level at which the voltage across the winding $N_{32}$ of reactor $X_2$ exceeds the source voltage. The voltage across the winding $N_{32}$ is then clamped at the level of the supply voltage during the recovery of reactor $X_2$ while energy stored in the D.C. choke is discharged to the D.C. source through the feedback winding $N_{32}$ and diode $D_1$.

During the recovery period of the reactor $X_2$ or during the period in which the reactor $X_2$ is returning to its initial D.C. saturated condition, the flow of current from the reactor $X_3$, as viewed in FIGURE 1, is in an upward direction through the load 11 and through the winding $N_{12}$ of the reactor $X_2$. Since the reactor $X_2$ is not yet saturated, load current flowing in winding $N_{12}$ produces by transformer action an additional component of current in winding $N_{32}$ which supplements the recovery current of reactor $X_2$. When reactor $X_2$ reaches its saturated condition, the voltage across winding $N_{12}$ falls off to zero. As will be seen from the waveform of the input current shown in FIGURE 2, there is no further transfer of energy through the reactor $X_3$ to the D.C. source for the remainder of the negative half cycle. Further, during the remainder of negative half cycle, as will be seen from the waveform of FIGURE 6, the voltage across winding $N_{13}$ is now equal to the load voltage and remains at this level until the reactor $X_3$ recovers. It will be noted from the waveform shown in FIGURE 5 that the recovery of the reactor $X_1$ occurs during the interval that the reactor $X_2$ is recovering, and both reactors $X_1$ and $X_2$ recover before the reactor $X_3$.

Diode $D_2$ is poled so that the energy released from the D.C. choke during the recovery period of reactor $X_1$ is dissipated in the resistor $R_3$ connected in series with the diode $D_2$. It will be understood that the energy released during the recovery period of the reactor $X_1$ may be fed back to the D.C. source by employing an auxiliary winding similar to that used in conjunction with the reactor $X_2$.

When the reactor $X_3$ recovers, the voltage across winding $N_{13}$ falls off to zero, and the bias voltage applied across the emitter-base junction by winding $N_{33}$ is removed, and a regenerative turn-on of the transistor $Q_1$ is again initiated by the current supplied through resistor $R_2$ to the base of transistor $Q_1$ from the D.C. source 16. Thus, with the turn-on of the transistor $Q_1$ another symmetrical cycle commences.

By way of a specific illustration of the invention, an apparatus 10 for operating a load with an alternating potential was constructed and reduced to practice. The apparatus 10, as reduced to practice, employed the following components identified below, which are given by way of an illustration of a particular embodiment of the invention:

| | |
|---|---|
| Transistor $Q_1$ | Texas Instrument 2N1046. |
| Diode $D_1$ | General Electric 4JA11D. |
| Diodes $D_2$, $D_3$ | General Electric 4JA11D. |
| Resistor $R_1$ | 470 ohms. |
| Resistor $R_2$ | 15,000 ohms. |
| Resistor $R_3$ | 10 ohms. |
| Reactor $X_1$ | Arnold toroidal core 2T4635D2. |
| Winding $N_{11}$ | 39 turns of .0142 inch in diameter wire. |
| Winding $N_{21}$ | 10 turns of .032 inch in diameter wire. |
| Reactor $X_2$ | Arnold toroidal core 2T4635D2. |
| Winding $N_{12}$ | 80 turns of .0142 inch in diameter wire. |
| Winding $N_{22}$ | 8 turns of .032 inch in diameter wire. |
| Winding $N_{32}$ | 80 turns of .0142 inch in diameter wire. |
| Reactor $X_3$ | Arnold toroidal core 2T4635D2. |
| Winding $N_{13}$ | 80 turns of .0142 inch in diameter wire. |
| Winding $N_{23}$ | 10 turns of .032 inch in diameter wire. |
| Winding $N_{33}$ | 18 turns of .0142 inch in diameter wire. |

The inverter 10 employing the foregoing components was used to operate a resistive load of 35 ohms and supplied an alternating output having a frequency of 1 kilocycle. A 15 volt D.C. supply was used as the source 16, and the bias terminals 12, 13 were connected to a bias source supplying 1.9 amperes. The circuit operated stably over a wide range of variations in the D.C. supply voltage and a wide range of variations in the D.C. bias current. It was found that the amplitude of the load current was essentially independent of the source voltage and the frequency of the load current was proportional to the magnitude of the input voltage.

By way of another more specific exemplification of the invention, a current limiting inverter 10, such as is illustrated in FIGURE 1, was constructed and operated to supply an alternating current at a frequency of 1.67 kilocycles to a 15 watt fluorescent lamp. The following specifications of the circuit components are cited by way of example and are not intended to limit the invention in any way:

| | |
|---|---|
| Transistor $Q_1$ | Delco 200 volt PNP Transistor. |
| Diode $D_1$ | General Electric 4JA11D. |
| Diodes $D_2$, $D_3$ | General Electric 4JA10D. |
| Resistor $R_1$ | 10 ohms. |
| Resistor $R_2$ | 1500 ohms. |
| Resistor $R_3$ | 5 ohms. |
| Reactor $X_1$ | Arnold toroidal core 2D4635D2. |
| Winding $N_{11}$ | 19 turns of .0142 inch in diameter wire. |
| Winding $N_{21}$ | 10 turns of .032 inch in diameter wire. |
| Reactor $X_2$ | Arnold toroidal core 2D4635D2. |
| Winding $N_{12}$ | 30 turns of .0142 inch in diameter wire. |
| Winding $N_{22}$ | 6 turns of .032 inch in diameter wire. |
| Winding $N_{32}$ | 50 turns of .0142 inch in diameter wire. |
| Reactor $X_3$ | Arnold toroidal core 2D4635D2. |
| Winding $N_{13}$ | 160 turns of .0142 inch in diameter wire. |
| Winding $N_{23}$ | 32 turns of .032 inch in diameter wire. |
| Winding $N_{33}$ | 16 turns of .0142 inch in diameter wire. |

Figure 10:
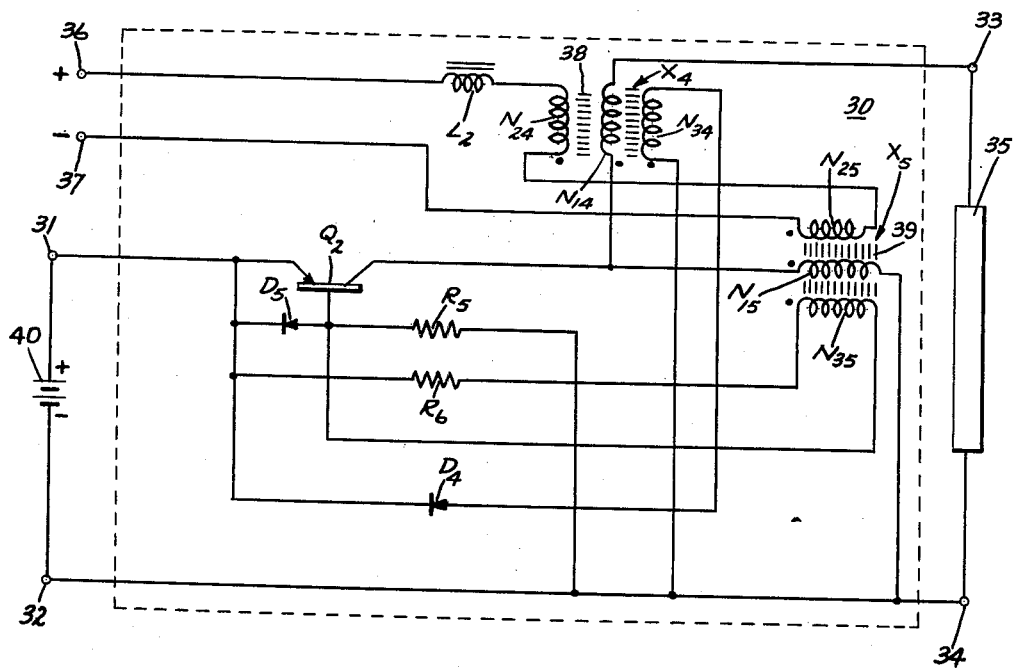
FIGURE 10 is a schematic circuit diagram of a current limiting circuit embodying one form of the invention wherein a single semiconductor switching device and a pair of saturating reactors are employed.

In FIGURE 10 I have illustrated a current limiting circuit 30 embodying another form of my invention. The current limiting inverter 30 is shown enclosed in a dashed rectangle and differs essentially from the inverter 10 shown in FIGURE 1 in that only a pair of saturating reactors $X_4$ and $X_5$ are employed.

The input terminals 31 and 32 are connected with a D.C. potential source 40. At its output terminals 33, 34, the current limiting inverter 30 provides an alternating output that is particularly adapted for the operation of a load 35 having an essentially negative impedance characteristic. Bias terminals 36, 37 are provided for connection to a suitable D.C. bias supply. An inductor or choke $L_2$ is connected in the bias circuit to store and return energy during the operating cycle. To obtain the sharp current limiting characteristic that produces a load current having essentially a square waveform, it was found necessary to suppress the bias circuit harmonic currents.

Like the saturating reactors in the other illustrated embodiments, the saturating reactors $X_4$ and $X_5$ preferably have cores 38, 39 made of a core material characterized by a substantially rectangular hysteresis loop. The bias windings $N_{24}$ and $N_{25}$ are connected in series circuit with the choke $L_2$ and in circuit with the bias input terminals 36, 37. Each of the main windings $N_{14}$ and $N_{15}$ are connected in a parallel circuit branch. The parallel circuit branch that includes the primary winding $N_{14}$ also includes the output terminals 34, 35 across which a load 35 is connected. The auxiliary winding $N_{34}$ and a diode $D_4$ are coupled across the source 40. A diode $D_5$ connected across the emitter-base junction of transistor $Q_2$ prevents the emitter-base junction from being damaged by an excessive reverse bias. Transistor $Q_2$ is biased to a low impedance condition by a current supplied through a resistor $R_5$. An auxiliary winding $N_{35}$ is coupled across the transistor $Q_2$ through the resistor $R_6$.

Operation of the current limiting circuit 30 is initiated when terminals 31, 32 and the bias input terminals 36, 37 are energized. The turn-on of transistor $Q_2$ to the low impedance condition is initiated by the base current flowing through the resistor $R_5$, and a regenerative turn-on is effected by the current induced in the auxiliary winding $N_{35}$. With transistor $Q_2$ in the low impedance condition, the current to the load 35 almost instantaneously rises to the level at which the ampere turns of the main winding $N_{14}$ cancel the ampere turns of the bias winding $N_{24}$. Also, at the time that the transistor $Q_2$ turns on, the current flowing through the parallel branch which includes the main winding $N_{15}$ is sufficient to bring the saturating reactor $X_5$ out of saturation. The positive half cycle of the alternating output supplied to the load 35 now commences, and load current is maintained at a substantially constant level by the saturating reactor $X_4$ while the flux condition of the saturable core 38 moves at a linear rate from negative saturation towards positive saturation. Also, during this interval, saturating reactor $X_5$ delivers energy to choke $L_2$ as the flux condition of reactor $X_5$ proceeds from negative saturation towards positive saturation at a linear rate.

The saturating reactor $X_5$ is designed with a volt-second capacity such that it will saturate before saturating reactor $X_4$. When saturating reactor $X_5$ saturates, the current through main winding $N_{15}$ and through transistor $Q_2$ increases sharply. Transistor $Q_2$ begins to unsaturate, and as its emitter-collector voltage increases, the voltage across the main winding $N_{15}$ collapses so that transistor $Q_2$ is driven in a regenerative fashion to the high impedance condition. When the transistor $Q_2$ is in the high impedance condition, the saturating reactors $X_4$ and $X_5$ enter their recovery periods. Since the directions of the recovery current for the saturating reactors $X_4$ and $X_5$ are in opposition to each other, the recovery voltage rises until the voltage across the main winding $N_{14}$ is equal to the voltage applied at the terminals 31, 32. The recovery current from the saturating reactor $X_4$ now flows back to the D.C. potential source through the auxiliary winding $N_{34}$.

During its recovery period the saturating reactor $X_5$ provides a reverse bias for the transistor $Q_2$ and a current flow through the load 35 in a reverse direction to start a negative half cycle of operation. It will be appreciated that the saturating reactor $X_5$ determines the direction of the load current during this initial portion of the negative half cycle. Further, during this initial portion of the cycle all of the energy that has been stored in the D.C. choke by the saturating reactor $X_4$ during the preceding positive half cycle is returned to the D.C. source. Also, a part of the energy stored in the choke $L_2$ is returned by reactor $X_5$ to the D.C. source.

The recovery period of saturating reactor $X_4$ is shorter than the recovery period of saturating reactor $X_5$. When saturating reactor $X_4$ recovers, the load current continues to be sustained by energy from choke $L_2$ supplied through saturating reactor $X_5$ for the remainder of the negative half cycle. During this latter portion of the negative half cycle no additional energy is returned to the source 40 since the current through the winding $N_{14}$ of saturating reactor $X_4$ merely drives saturating reactor $X_4$ further into negative saturation. At the end of the recovery period of the saturating reactor $X_5$, the voltage across the main winding $N_{15}$ collapses. Thus, the reverse bias across the emitter-base junction of transistor $Q_2$ is removed, and transistor $Q_2$ is driven to a low impedance condition to initiate another cycle of operation.

From the foregoing description of the illustrated embodiment of my invention, it will be apparent that I have provided an improved inverter that is inherently current-limiting and that is particularly adaptable to operating fluorescent lamps at relatively high frequencies from a D.C. source.

By selecting the proper parameters for the saturating reactors it is possible to achieve a nearly symmetrical load current waveform. It will be appreciated that this symmetry is not appreciably affected by variations in the line or load voltages. If desired, the output current of the improved current limiting inverters can be readily controlled by varying the D.C. bias current and may be readily adapted to dimming applications where electric discharge lamps are operated by the current limiting inverters. An important advantage of the improved current limiting inverter is that it requires only one semiconductor switching device.

It will be understood that other semiconductor switching devices, such as silicon controlled rectifiers, four layer or Shockley diodes, gate-turn-off controlled rectifiers and other semiconductor switching devices, may be employed as the switching element of the improved inverter. It will be apparent that many other modifications may be made to the particular embodiments of the invention described herein. Therefore, I intend by the appended claims to cover all such modifications that fall with the true spirit and scope of the invention.

What I claim as new and desire to secure by Letters Patent of the United States is:

1. In a current limiting inverter for supplying an alternating potential to an electric discharge device from a D.C. potential source, an input means including input terminals for connection to the D.C. potential source, an output means including output terminals for connection to the electric discharge device, a semiconductor switching means operable between a low impedance and a high impedance condition, and connected in circuit with one of said input terminals, first, second and third saturating reactors, each of said saturating reactors having a saturable core, a main winding wound thereon with a predetermined number of turns and a bias means associated therewith for applying a bias magnetomotive force in opposing relationship to the magnetizing magnetomotive force of the main winding, said first saturating reactor being connected in series circuit relation with said semiconductor switching means, first and second parallel circuit branches, said circuit branches being connected in circuit with said first saturating reactor and the other of said input terminals, said first circuit branch including said second saturating reactor and said output terminals, said second circuit branch including said third saturating reactor, said predetermined number of turns of the main windings of said second and third saturating reactors being sufficient to provide a magnetomotive force at desired current levels that cancels said bias magnetomotive force, said second and third reactors thereby presenting a high impedance during their unsaturated condition to limit the current supplied from the source during the positive half cycle, said first saturating reactor being driven out of saturation near the end of the positive half cycle when the third saturating reactor approaches saturation to cause said first saturating reactor to thereby support voltage and reduce the voltage across said third saturating reactor, and means responsive to the voltage across said third saturating reactor to drive said semiconductor switching means to a high impedance condition in order to allow said saturating reactors to recover, the current to the output means during the negative half cycle being provided by at least one of said saturating reactors during its recovery period.

2. In a current limiting inverter for operating an electric discharge device, input terminals for connection to a D.C. source, output terminals for connection to the electric discharge device, a semiconductor device operable between a low impedance and a high impedance condition and connected in circuit with one of said input terminals, first, second and third saturating reactors, each of said saturating reactors having a saturable core and a means associated therewith for applying a bias magnetomotive force in opposing relationship to the magnetizing magnetomotive force of the main winding of said reactor, said first saturating reactor being connected in circuit with said semiconductor device, a first circuit branch including said second saturating reactor and said output terminals, a second circuit branch connected in parallel circuit with said first circuit branch, said second circuit branch including said third saturating reactor, said first and second circuit branches being connected at one end in circuit with first saturating reactor and at the other end with one of said input terminals, said main windings of said second and third saturating reactors providing sufficient magnetizing magnetomotive force at the desired current levels during each positive half cycle of the alternating potential at the output terminals to cancel said bias magnetomotive force and thereby present a high impedance to limit the current supplied from the source to the output terminals, means responsive to the condition of said third saturating reactor to drive said semiconductor device to a high impedance condition, and means for driving said semiconductor device to the low impedance condition when said third saturating reactor has recovered, said third saturating reactor during its recovery supplying current to the output terminals during the negative half cycle.

3. In a current limiting inverter for supplying an alternating potential to an electric discharge lamp from a D.C. potential source, an input means including input terminals for connection to the D.C. potential source, an output means including output terminals for connection to the electric discharge lamp, a semiconductor device operable between a low impedance and a high impedance condition and connected in circuit with one of said input terminals, first, second and third saturating reactors, each of said saturating reactors having a saturable core and a bias means associated therewith for applying a bias magnetomotive force in opposing relationship to the magnetizing magnetomotive force of the main winding of said reactor, a first circuit branch including said second saturating reactor and said output terminals, a second circuit branch connected in parallel circuit relation with said first circuit branch and including said third saturating reactor, said parallel circuit branches being connected in circuit with said first saturating reactor and said input means, said main windings of the second and third saturating reactors providing a sufficient magnetizing force at desired current levels to cancel said bias magnetomotive force and thereby presenting a high impedance during the positive half cycle when the semiconductor device is in the low impedance condition to limit the current supplied from the source to the output terminals, means responsive to the condition of said third saturating reactor to drive said semiconductor device to a high impedance condition to interrupt the supply of potential from the source and to allow said saturating reactors to recover, means for driving the semiconductor device to a low impedance condition when said third saturating reactor recovers, and a third winding inductively coupled on said second saturating reactor and connected in circuit across the input means to provide a path for the return of energy released from the bias means through the second saturating reactor to the D.C. source during its recovery, said third saturating reactor delivering energy from bias means to the output terminals when the supply of potential from the source is interrupted.

4. The current limiting inverter set forth in claim 3 wherein a resistor and a unidirectional conducting device is connected across the main winding of the first saturating reactor to provide a means for dissipating the energy released therefrom during its recovery period.

5. In a current limiting inverter for supplying an alternating potential to an electric discharge lamp from a D.C. potential source, an input means including input terminals for connection to the D.C. potential source, an output means including output terminals for connection to the electric discharge device, a transistor having an emitter, collector and base electrodes and being operable between a low impedance and a high impedance condition, said transistor being connected in circuit with one of said input terminals, first, second and third saturating reactors, each of said saturating reactors having a saturable core and a bias means associated therewith for applying a bias magnetomotive force in opposing relationship to the magnetizing magnetomotive force of the main winding of said reactor during operation, said first saturating reactor being connected in series circuit relation with said transistor, a first parallel circuit branch including said output terminals and said second saturating reactor, a second circuit branch connected in parallel circuit relation with the first circuit branch and including said third saturating reactor, said first and second parallel circuit branches being connected in circuit with said first saturating reactor and the input means, said main windings of said second and third saturating reactors providing sufficient magnetizing magnetomotive force at desired current levels during the low impedance condition of the transistor to cancel said bias magnetomotive force thereby to limit the current supplied from the source to the output terminals, said first saturating reactor being driven out of saturation near the end of the positive half cycle when the third saturating reactor approaches saturation to cause said first saturating reactor to support voltage and to reduce the voltage across said third saturating reactor, an auxiliary winding wound on said saturable core of said third saturating reactor and coupled across the base and emitter electrodes of said transistor to drive said transistor to the high impedance condition in response to the voltage induced across the auxiliary winding and means for driving said transistor to its low impedance condition to initiate a new cycle after the third saturating reactor has recovered, said third saturating reactor supplying energy from the bias means to the output terminals during its recovery period.

6. The current limiting inverter set forth in claim 5 wherein a feedback winding is inductively coupled with the main winding of the second saturating reactor and is connected in circuit with the D.C. input terminals to provide a path through a unidirectional conductive device for the return of the energy released from said second saturating reactor to the source and for the return of a portion of the energy released from the third saturating reactor to the source during the unsaturated condition of the second saturating reactor.

7. In a current limiting inverter for supplying an alternating potential to a load from a D.C. potential source, input terminals for connection to the D.C. potential source, output terminals for connection to the load, a semiconductor switching means operable between a low impedance and a high impedance condition and connected in circuit with one of said input terminals, first, second and third saturating reactors, each of said saturating reactors having a saturable core, a main winding and a bias means associated therewith for applying a bias magnetomotive force in opposing relationship to the magnetizing magnetomotive force of the main winding, said first saturating reactor being connected in series circuit relation with said semiconductor switching means, a first circuit branch including said output terminals and said second saturating reactor, a second circuit branch connected in parallel circuit relation with said first circuit branch and including said third saturating reactor, said parallel circuit branches being connected in circuit with said first saturating reactor and the other one of said input terminals, said main windings of said second and third saturating reactors providing sufficient magnetomotive force at desired current levels to cancel the bias magnetomotive force thereby to limit the current supplied from the source to the output terminals during the positive half cycle, and means responsive to the condition of said third saturating reactor to drive said semiconductor device to a high impedance condition to permit said saturating reactors to recover, said third saturating reactor during its recovery period providing a current to the output terminals during the negative half cycle of the alternating output.

8. The current limiting inverter set forth in claim 7 wherein a feedback winding is inductively coupled on at least said second saturating reactor and connected in circuit across said input terminals to provide a path for returning energy stored in said saturating reactor to the D.C. source.

9. A current limiting inverter for supplying an alternating potential to a load from a D.C. potential source, a semiconductor device operable between a low impedance and a high impedance condition for connection with the D.C. potential source, output terminals for connection to the load and for supplying the alternating potential thereto, first, second and third saturating reactor means, each of said saturating reactor means including a saturable core, a main winding and a bias means associated therewith for applying a bias magnetomotive force in opposing relationship to the magnetizing magnetomotive force of the main winding, said first saturating means being connected in circuit with said semiconductor device, a first circuit branch including said second saturating reactor means and said output terminals, a second circuit branch connected in parallel with said first branch and including said third saturating reactor means, said parallel connected circuit branches being adapted for connection at one end thereof to said first saturating reactor means and at the other end thereof to the D.C. source, said second and third reactor means providing during the positive half cycle sufficient magnetizing magnetomotive force at desired current levels to cancel the bias magnetomotive force thereby to limit the current supplied from the source to the output terminals in the positive half cycle, said first reactor means being driven out of saturation near the end of the positive half cycle when the third reactor means is approaching saturation to cause said first reactor means to thereby support the voltage and reduce the voltage across said third reactor means, means responsive to the voltage across said third reactor means to drive said semiconductor device to a high impedance condition to allow said reactor means to recover, and means for switching said semiconductor device to a low impedance condition when said third reactor means has recovered, said third reactor means providing the current to the output terminals during the negative half cycle of the alternating output.

10. The current limiting inverter set forth in claim 9 wherein said second reactor means includes a feedback winding inductively coupled with the main winding thereof and connected in circuit across the input terminals to provide a path for the return of energy to the D.C. source during the recovery of the second reactor means.

11. In a current limiting inverter for supplying an alternating potential to a fluorescent lamp from a D.C. potential source, a first and second input terminal for connection to the D.C. potential source, a pair of output terminals for connection to the fluorescent lamp, a semiconductor device operable between a low impedance and a high impedance condition and connected in circuit with said first input terminal, first, second and third saturating reactors, each of said saturating reactors having a saturable core, a main winding and a bias winding associated therewith for applying a bias magnetomotive force in opposing relationship to the magnetizing magnetomotive force to the main winding, said bias winding being adapted for connection to a source of bias current, said first saturating reactor being connected in series circuit relation with said semiconductor device, a resistor and a diode connected in shunt with the main winding of said first saturating reactor to dissipate energy released from said first saturating reactor during its recovery period, a feedback winding inductively coupled with said main winding of said second saturating reactor and connected in circuit across said input terminals to provide a path for the return of energy to the D.C. source during the recovery period of said second saturating reactor, an auxiliary winding inductively coupled with the main winding of said third saturating reactor and connected in circuit with said semiconductor device to drive said device to its low impedance condition in response to the voltage across said main winding of said third saturating reactor, a first circuit branch including said second saturating reactor and said output terminals, a second circuit branch connected in parallel circuit relation with said first branch and including said third saturating reactor, said parallel connected first and second circuit branches being connected in circuit with said first saturating reactor and said second input terminal, said main windings of said second and third saturating reactors providing a magnetizing magnetomotive force during each positive half cycle to cancel the bias magnetomotive force thereby to limit the current supplied from the source to the circuit branches during the positive half cycle, said first saturating reactor being driven out of saturation near the end of the positive half cycle when the third saturating reactor approaches saturation to cause said first saturating reactor to support voltage from the D.C. source and thereby decrease the voltage across the parallel circuit branches, and means for driving said semiconductor device to the low impedance condition when said third saturating reactor has recovered, said third saturating reactor providing the current at the output terminals during the negative half cycle of the alternating output.

12. A current limiting inverter for supplying an alternating potential to a load from a D.C. potential source, said current limiting inverter comprising: input terminals for connection to the D.C. potential source, output terminals for connection to the load, a first and a second saturating reactor, each of said saturating reactors having a saturable core, and a bias means associated therewith for applying a bias magnetomotive force in opposing relationship to the magnetizing magnetomotive force of the main winding of said reactor, a first circuit branch including said output terminals and said first saturating reactor, a second circuit branch connected in parallel circuit relation with said first circuit branch and including said second saturating reactor, a semiconductor device operable between a low impedance and a high impedance condition, means responsive to the condition of said second saturating reactor to drive said semiconductor device to a high impedance condition, circuit means connecting said semiconductor device in circuit with one of said input terminals and said circuit branches, and a feedback winding inductively coupled on said first saturating reactor and connected in circuit across the input terminals to provide a path for the return of the energy stored in said bias means through said saturating reactor to the source when said semiconductor device is driven to the high impedance condition and interrupts the supply of potential from the source, said second saturating reactor being energized by the bias means during its recovery period and supplying a current to the output terminals to provide the negative half cycle of the alternating output.

13. The current limiting inverter set forth in claim 12 wherein said bias means of said first saturating reactor includes a bias winding wound on the saturable core of said first reactor and said bias means of said second reactor includes a bias winding wound on the saturable core of said second reactor, said bias windings being connected in series circuit relation, and an inductor connected in circuit with the bias windings to store energy and to suppress harmonic currents in said bias windings thereby to cause the load current to have an essentially square waveform, said winding being adapted for connection to a D.C. bias source.

14. In a current limiting inverter for supplying an alternating potential to a load from a D.C. potential source, an input means including input terminals for connection to the D.C. potential source, an output means including output terminals for connection to the load, a semiconductor device operable between a low impedance and a high impedance condition and connected in circuit with said input means, a first and a second saturating reactor, each of said saturating reactors having a saturable core, a main winding and a bias means associated therewith for applying a bias magnetomotive force in opposing relationship to the magnetizing magnetomotive force of the main winding, a first circuit branch including said first saturating reactor and said output terminals, a second circuit branch connected in parallel circuit relation with said first circuit branch and including second saturating reactor, said parallel circuit branches being connected in circuit with said semiconductor device and said input means, said first saturating reactor presenting a high impedance during the positive half cycle when the semiconductor device is in the low impedance condition to limit the current supplied from the source to the load at a predetermined level, means responsive to the saturation of said second saturating reactor to drive the semiconductor device to the high impedance condition to interrupt the supply of potential from the source and allow said saturating reactors to recover, said semiconductor device being driven to a low impedance condition when said second saturating reactor recovers, and an auxiliary winding inductively coupled on said saturable core of said first saturating reactor and connected in circuit across said input means to provide a path for the return of energy released from said bias means through said first saturating reactor to the D.C. source during the recovery period of said first saturating reactor, said second saturating reactor sustaining the flow of current to the output terminals during the negative half cycle when the supply of potential from the source is interrupted.

15. The current limiting inverter set forth in claim 14 wherein said bias means associated with each of said saturating reactors includes a bias winding inductively coupled on the saturable core thereof, said bias windings being connected in series circuit relation with an inductor, said inductor storing energy and returning energy and thereby suppressing harmonic currents in said bias winding and causing a substantially square load current waveform to be supplied at the output terminals and said bias windings being adapted for connection to a D.C. bias source.

No references cited.

ROY LAKE, *Primary Examiner.*